(12) United States Patent
Cordoba

(10) Patent No.: US 11,800,875 B2
(45) Date of Patent: Oct. 31, 2023

(54) AUTOMATIC APPARATUS FOR BAKING PASTRY PRODUCTS

(71) Applicant: TIGOUT INC., Delaware, MD (US)

(72) Inventor: Rodrigo Cordoba, Buenos Aires (AR)

(73) Assignee: TIGOUT INC., Wilmington, DE (US)

(*) Notice: Subject to any disclaimer, the term of this patent is extended or adjusted under 35 U.S.C. 154(b) by 0 days.

(21) Appl. No.: 17/607,251

(22) PCT Filed: Jan. 21, 2021

(86) PCT No.: PCT/US2021/014340
§ 371 (c)(1),
(2) Date: Oct. 28, 2021

(87) PCT Pub. No.: WO2021/154580
PCT Pub. Date: Aug. 5, 2021

(65) Prior Publication Data
US 2022/0369653 A1    Nov. 24, 2022

Related U.S. Application Data

(60) Provisional application No. 62/966,829, filed on Jan. 28, 2020.

(51) Int. Cl.
A21B 5/02 (2006.01)
A21B 1/44 (2006.01)
(Continued)

(52) U.S. Cl.
CPC ............ *A21B 5/02* (2013.01); *A21B 1/44* (2013.01); *A21B 3/02* (2013.01); *A47J 37/015* (2013.01); *F24C 7/085* (2013.01); *F24C 15/325* (2013.01)

(58) Field of Classification Search
CPC .... A21B 1/44; A21B 5/00; A21B 5/02; A21B 3/02; A47J 37/015; A47J 37/0629
See application file for complete search history.

(56) References Cited

U.S. PATENT DOCUMENTS

| | | | |
|---|---|---|---|
| 2,593,233 A * | 4/1952 | White | F24C 15/16 126/39 C |
| 5,147,994 A | 9/1992 | Smith et al. | |

(Continued)

FOREIGN PATENT DOCUMENTS

| | | |
|---|---|---|
| EP | 1902620 A1 | 3/2008 |
| FR | 2672774 A | 8/1992 |

(Continued)

OTHER PUBLICATIONS

International Search Report dated Apr. 6, 2021, in connection with PCT International Application No. PCT/US2021/014340.

*Primary Examiner* — Thien S Tran
(74) *Attorney, Agent, or Firm* — Norris McLaughlin, P.A.

(57) ABSTRACT

An automatic apparatus for baking pastry products, wherein baking molds containing a pastry mass to be baked are introduced into the apparatus for baking purposes, wherein the apparatus comprises a reception or cooling module that defines a pre-chamber, a baking module, and a rotary oven door arranged between said modules so as to rotate for positioning the molds between reception, baking and cooling positions, thus avoiding the use of additional mechanical parts that may generate failures and inconveniences in the normal operation of the appliance, while the invented apparatus provides a better quality baked product that is achieved by homogeneous heating within the oven module.

12 Claims, 6 Drawing Sheets

(51) Int. Cl.
*A21B 3/02* (2006.01)
*A47J 37/01* (2006.01)
*F24C 7/08* (2006.01)
*F24C 15/32* (2006.01)

(56) References Cited

U.S. PATENT DOCUMENTS

| | | | | |
|---|---|---|---|---|
| 5,365,918 A | * | 11/1994 | Smith | F24C 15/162 |
| | | | | 126/21 R |
| 5,433,139 A | | 7/1995 | Kitagawa et al. | |
| 5,639,497 A | | 6/1997 | Bedford et al. | |
| 2011/0120318 A1 | * | 5/2011 | Cheung | A47J 37/042 |
| | | | | 99/331 |
| 2015/0044340 A1 | | 2/2015 | Preciado et al. | |
| 2015/0150413 A1 | | 6/2015 | Lee et al. | |
| 2019/0327795 A1 | * | 10/2019 | Hannah | F24C 7/088 |

FOREIGN PATENT DOCUMENTS

| | | |
|---|---|---|
| FR | 2764417 A | 12/1998 |
| WO | 2019/040112 A1 | 2/2019 |

\* cited by examiner

AUTOMATIC APPARATUS FOR BAKING PASTRY PRODUCTS

This application is a 371 application of PCT/US2021/014340 filed Jan. 21, 2021, which claims priority benefit under 35 U.S.C. § 119 of U.S. Provisional Application No. 62/966,829, filed Jan. 28, 2020, the disclosures of which are incorporated herein by reference.

STATE OF THE ART OF THE INVENTION

Field of the Invention

The present invention relates to the production of pastry, bakery and salty products, and more particularly it relates to an apparatus for cooking or baking pastry products from a prepared and packaged pastry dough, and even more particularly the invention relates to an apparatus, preferably automatic, for baking a pre-prepared (uncooked—raw) dough, batter or fluid packaged for the production of pastry products.

Preferably, the invention refers to an apparatus for baking pastry products, wherein the apparatus comprises an oven module and a reception module, with the reception module defining a reception and/or cooling area for baking molds that contain the pastry product, and a rotary oven door that rotates in order to position the baking molds or containers of the pastry dough between said reception modules and oven module, thus improving safety in the baking process and avoiding the use of excessive mechanical parts that may cause inconveniences in the operation of the baking appliance.

Description of the Prior Art

Many machines, apparatus and devices are known for the preparation of products for food consumption, including machines for preparing coffee, machines for kneading and baking bread, as well as other products such as baked dough known as "waffles", tortillas, pancakes and the like. The vast majority are bulky machines for industrial use while a few are for home use and there are no domiciliary and preferably automatic machines that can bake a pre-prepared dough to obtain a ready-to-eat pastry product.

Among the machines for industrial use, the European Patent EP 1902620 may be mentioned which describes an automatic wafer cooking apparatus for baking wafers from a liquid or pastry dough, comprising two cooking molds, each having cooking plates, movement means for moving at least one plate with respect to the other so that each baking mold can move from a closed configuration to an open configuration, heating means for heating the plates to a predetermined cooking temperature, means for injecting a predetermined amount of dough between the baking plates of each mold, and means for removing a baked wafer from a baking mold, wherein each baking mold is stationary in the apparatus and is independent from the other.

Another known machine is that of the French Patent FR 2672774 which serves to prepare unit quantities of dough, which can be automatically stored, kept and dispensed, such as waffles, pancakes and similar products, wherein starting from unit quantities of dough containing, thoroughly mixed, the ingredients of the mixture and the machine is automatic and comprises an isothermal storage enclosure for the stacks of unit dough quantities, means for taking a quantity of dough and for distributing it to a timed heating system having molds for waffle and a system for ejecting the products once they have been cooked.

French Patent FR 2764417 discloses a potato chip vending machine which has a storage space containing the pre-cut chips which are placed in individual containers stacked on inclined shelves and then chips are conveyed to a heating chamber, and when the chamber is heated, it is turned to pour the chips in a container ready for being delivered to the exit where the user picks up the package.

U.S. Pat. No. 5,147,994 discloses a method and apparatus for vending a hot food product wherein a sealed container is moved from a protective sleeve and deposited in an oven where heat is transferred to the container for initially melting a protective sealing film and then heating the food product. After the food product has been heated, the container is removed from the oven and reinserted into the protective sleeve prior to dispensing the heated food product.

U.S. Pat. No. 5,433,139 discloses a bread making machine that prepares a dough by mixing and kneading water and ingredients poured into a bread baking box. The bread making machine is provided with an outdoor air temperature detector and an outdoor air humidity detector, and a dough fermentation condition corresponding to a predetermined degree of bread rise based on the correlation data of the outside air temperatures and humidity of the air, degree of rise and the values detected by the outside air temperature and humidity detectors.

The published Patent Application US 2015/0044340 discloses a method and a machine for the automatic preparation of flat breads, i.e. in the form of a tortilla, which comprises a feeding system and compartment for transporting several capsules that are hermetically sealed and that contain a portion of dough to produce a single flat bread, a system for opening each first capsule that arrives by pressure or by means of cutting so that the dough is ejected from the capsule and falls on a hot cooking plate, there being also a second hot plate. At least one of the two hot plates can be moved to open and allow the dough to fall and then closed to cook the dough to form the tortilla or pancake. Then a receiving compartment receives the finished flat breads when the hot plates are opened to drop the cooked breads. This machine is in general of industrial use and, although it could reduce its size for a domiciliary use it does not have a configuration prepared for it. In addition, it is restricted to baking dough to obtain tortilla or pancakes, that is to say flat products, which, in general, are not subjected to leavening or fermentation processes but only to baking. Therefore, its configuration results in a simple combination of two hot plates between which the dough is received; they are closed to bake the dough and opened to let it fall.

WO 2019/040112 A1, to the same Applicant of the present invention, discloses an apparatus for baking pastry products, wherein one or more packages, each containing a pastry dough, are introduced and which are capable of being opened, wherein the apparatus comprises a support module that defines a receiving housing; a baking module that defines an interior enclosure that has a shutter gate that forms a passage between said support module and said enclosure and a conveyance mechanism movably mounted between said at least a support module and said at least a baking module. Although this last mentioned machine has proven to work with very good results, it suffers from a certain complexity.

The market, preferably, but not restrictively, of home appliances, lacks a machine that can receive different types of dough already prepared and obtain pastry products that require fermentation and rising of the dough inside an oven that may generate conditions of uniform and controlled heat to allow the correct baking of the product, being also able to deliver the product in conditions to be consumed immediately.

BRIEF DESCRIPTION OF THE INVENTION

It is therefore an object of the present invention to provide a new apparatus or machine for obtaining a pastry product from packages or unit capsules containing a ready-made pastry dough, "batter", fluid which can inserted into the apparatus of the invention to cook or bake the dough and to obtain a pastry product delivered by the apparatus in conditions to be consumed immediately.

It is also an object of the present invention to provide an apparatus for baking pastry products that includes a reception module in which product-containing baking molds are received for baking and for cooling down the baked products for dispensing the pastry product ready to consume.

It is still an object of the present invention to provide an apparatus for baking pastry products that includes a rotary oven door that allows the baking molds to be positioned between said reception module and an oven module in a simple, ready and practical way, avoiding the use of additional parts or parts that may generate failures in the operation of the appliance.

It is still an object of the present invention to provide an active and passive security system that protects the physical integrity of the people and the apparatus of the invention.

It is also an object of the present invention to provide an automatic apparatus which provides a homogeneous heating of the interior of the oven module in order to reach the ideal cooking or baking temperature in less time.

It is also an object of the present invention to provide an automatic apparatus for baking pastry products, comprising a mold housing that houses the baking molds in a suspended or hanging way, so that both hot and cold air currents can homogeneously wrap the molds and guarantee a proper baking and cooling as well as an excellent quality for the baked product.

It is also an object of the present invention to provide an automatic apparatus for baking pastry products, wherein the automatic apparatus is capable of receiving at least one baking mold containing a pastry dough to be baked, the apparatus comprising:

an oven module comprising a main body (34) defining an interior baking chamber that is heated by a heating module, wherein the oven module comprises a front part with a front opening forming a passage between a reception module and said interior baking chamber, with the passage being operatively closable by a rotary oven door; and wherein the rotary oven door is rotatably mounted and driven by a rotary drive mechanism that comprises a rotation axis that passes through said rotary oven door to define together a rotary partition wall, wherein said rotation axis has a lower end that is mounted on a moto-reducer and a top end mounted on a first bearing, the rotary oven door being provided with a mold housing that receives at least one baking mold.

DETAILED DESCRIPTION OF THE INVENTION

Figure 1:
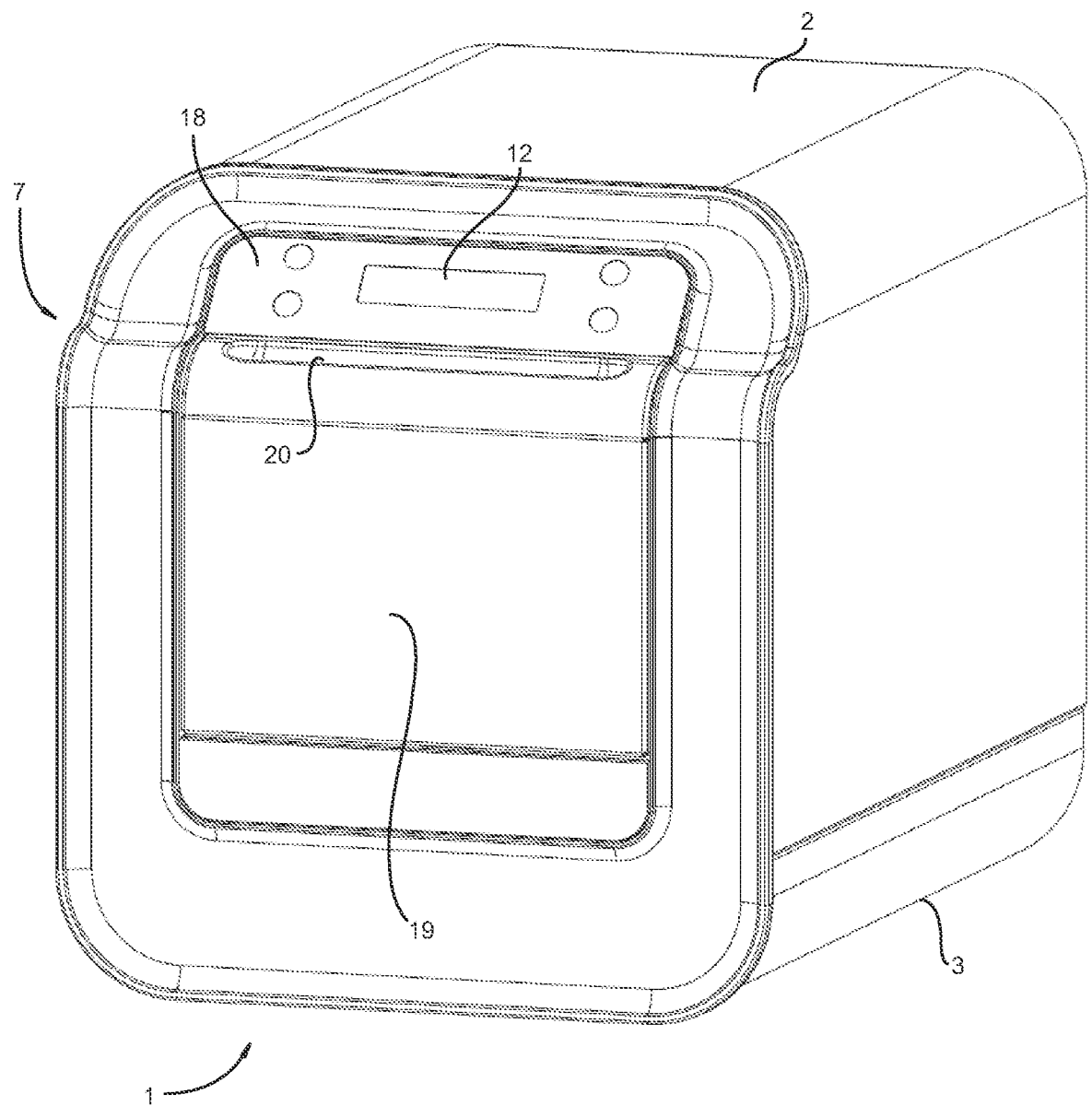
FIG. 1 shows a perspective view of the automatic apparatus for baking pastry products according to the present invention.
Figure 2:
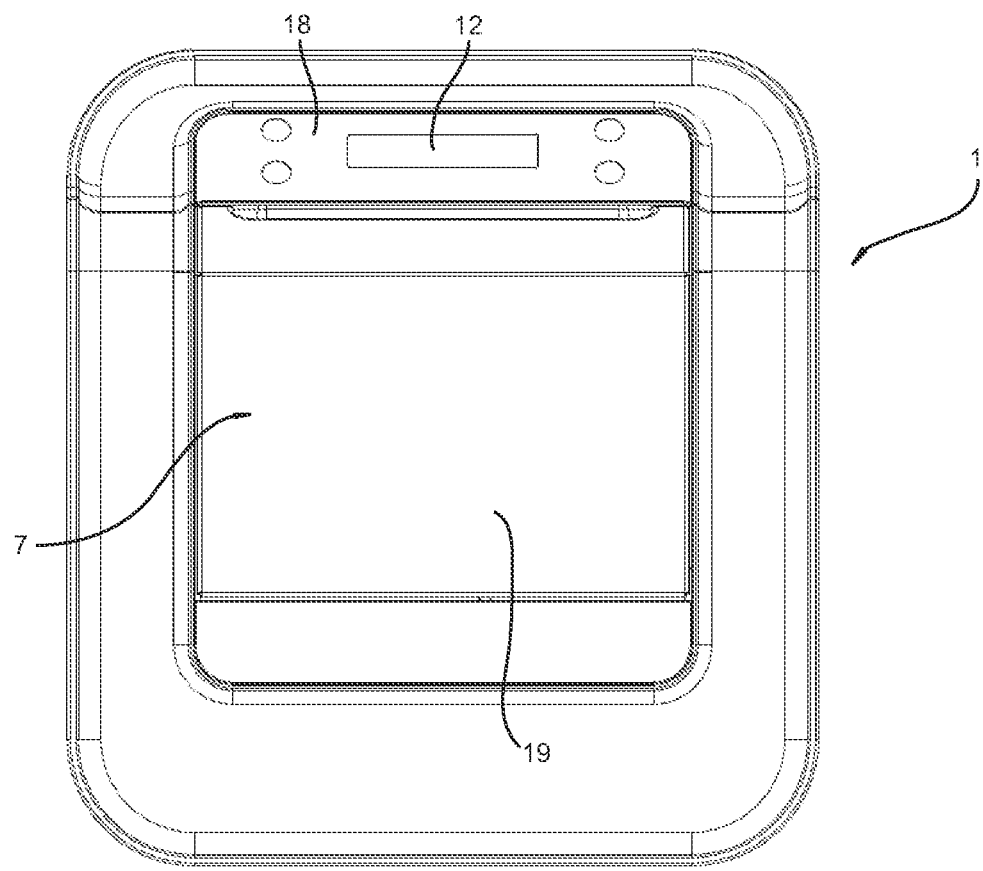
FIG. 2 shows a front view of the automatic apparatus for baking pastry products of the invention.
Figure 3:
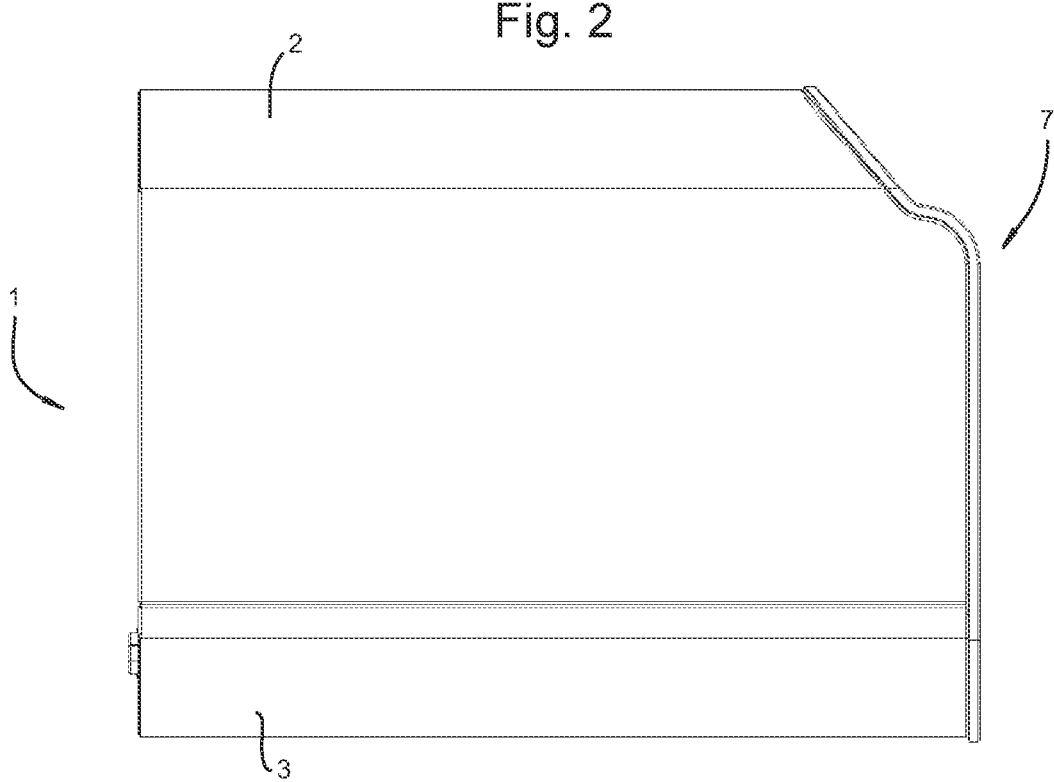
FIG. 3 shows a side view of the automatic apparatus for baking pastry products of the present invention.

For the purposes of the description referred to this invention the terms bake, cooking, baking, to cook or to bake shall be interpreted as equivalent, and are the action for obtaining a pastry product in conditions to be consumed and obtained from a dough prepared with the ingredients comprising it according to the type of pastry product you want to obtain.

Prepared dough or pre-prepared dough are understood as any dough prepared and mixed with the ingredients comprising it, whereon it is uncooked, that is, raw.

A pastry product is any product such as bread, dough, pastries, sweets, salty products, etc. that is obtained from a dough that can rise or not, its volume, that can be leavened or fermented.

The package that can be opened can be any closed package, container or receptacle that contains a pastry dough and that is capable of being opened by breaking it, by extrusion, by crushing, by removing some sealed part, such as a removable cap, so as to being able to remove the raw or already baked dough, and which is made of any material capable of containing an edible product.

Thus, the automatic apparatus for baking pastry products of the present invention is indicated by the general reference 1 and, FIGS. 1 to 5, an upper cover 2, a bottom cover 3 provided with a venting grille 4 for the internal ventilation of the components housed inside the apparatus of the invention, a rear cover 5 provided with a circuit breaker switch (not shown) and the respective connector tabs for electrical power supplies, and a front cover 7. The front cover 7 comprises a plastic front 8 with a frame window 9 in whose upper part there is a housing 10 for a control panel 11 that comprises a physical interface with a display screen 12, such as an LCD display or a color screen, an on/off touch button 13, an on/off led lighting (not shown), a return touch button 15, an arrow up touch button 16, an arrow down touch button 17. Optionally, the number of such buttons may be reduced to two buttons, namely an on/off button, a confirm/cancel button and a selector for selecting recipes and other variables, and a display front 18 that covers the above three components. The physical interface through the mentioned commands will allow the selection of the baking recipes, as well as the turning on and off of the apparatus of the invention, among others.

Frame window 9 is shut by means of a door 19 with a handle 20 which is mounted on said front cover 7 by means of respective hinges or the like. The closing or opening of said door 19 is sensed by at least one open door sensor 21 arranged in a portion of a closing seat 22 provided in the lower part of said frame window 9. The open door sensor 21 sends a signal corresponding to a controller for the activation of a safety lock that will automatically lock/unlock door 19 to provide greater security to the baking process and avoid any type of damage or burns that the person may suffer from any carelessness or unforeseen event. Alternatively, no safety lock is provided and, instead, the blocking of the door is made by blocking the operation of a door actuating motor. Said closing seat 22 of frame window 9 also has respective through grooves 23, while said door 19 can have a section 24 for logos or the like. It is highlighted that closing of said door 19 in said frame window 9 can be carried out by means of a mechanical, electromagnetic, magnetic, electrical locking system or the like, being that the closing seat 22 acts as a stop for the movement of said door 19, guaranteeing a safety closure.

Figure 4:
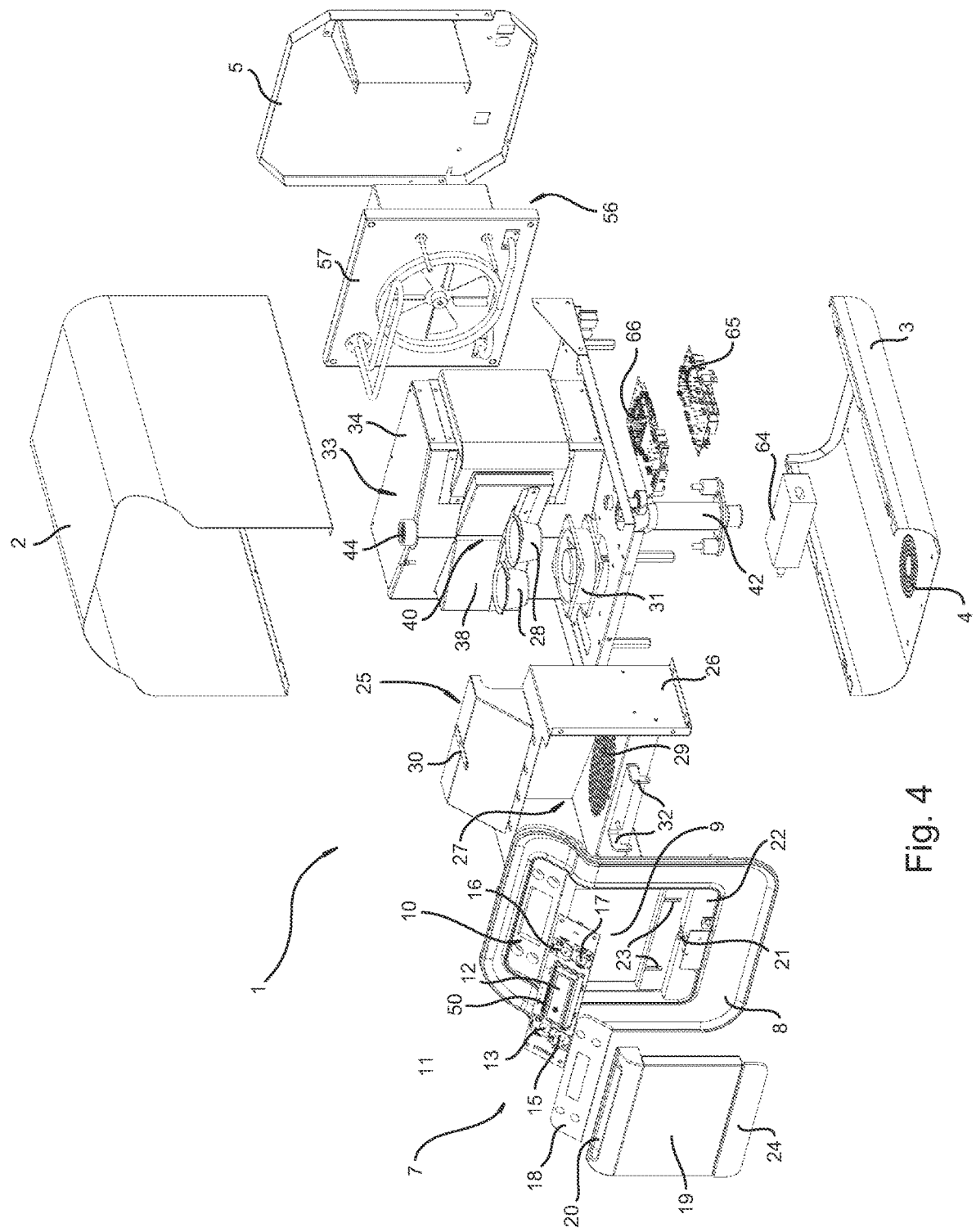
FIG. 4 shows an exploded perspective view of the automatic apparatus for baking pastry products according to the present invention.
Figure 5:
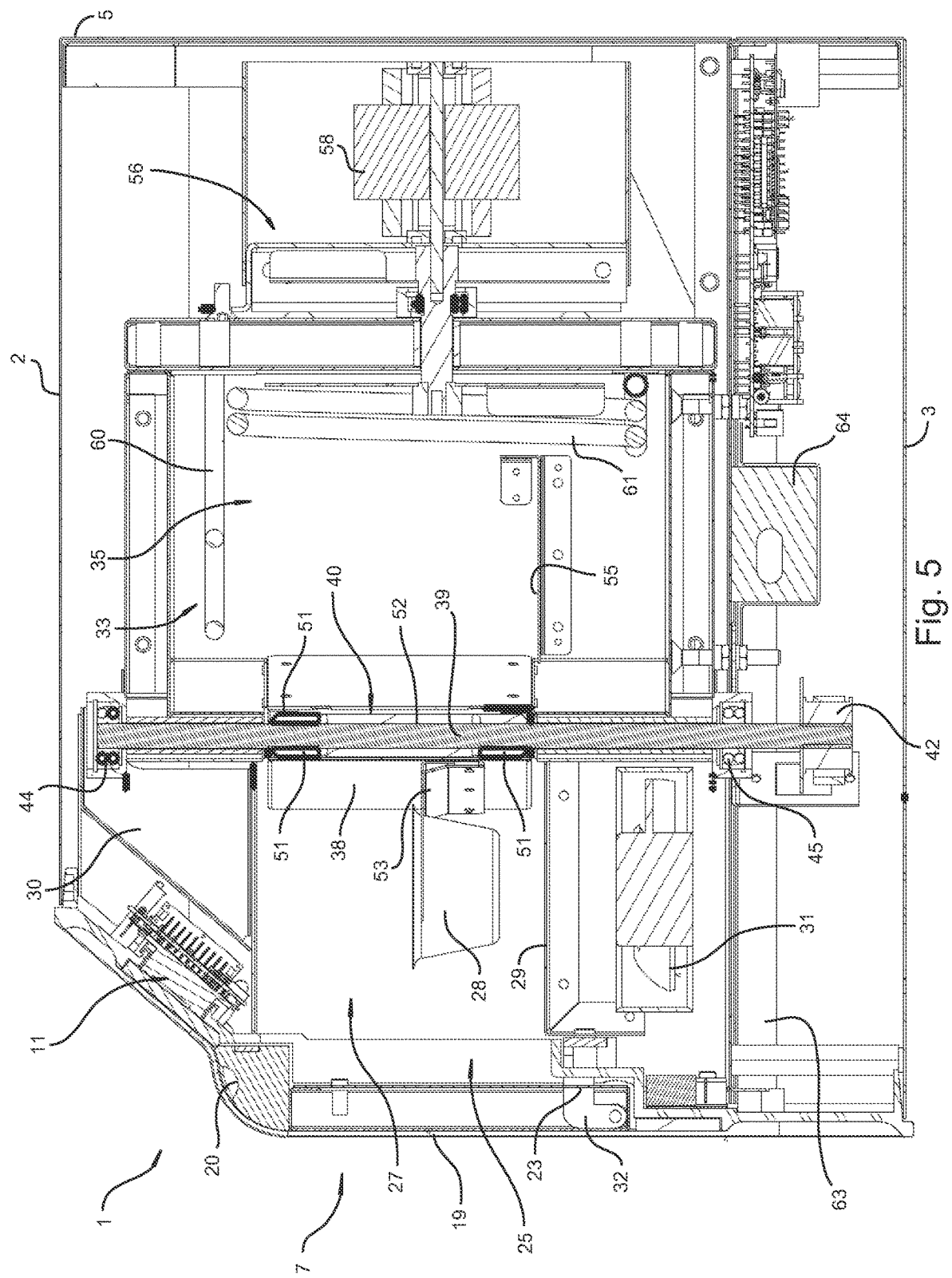
FIG. 5 shows a cross-sectional side view of the automatic apparatus for baking pastry products of the invention, where the interior components can be observed.

FIGS. 4 and 5 show the inner parts of the apparatus 1 which comprises at least one reception module 25 that comprises a chassis structure 26 within which a reception/cooling pre-chamber 27 is defined for receiving at least one baking mold 28, preferably more than one baking molds. Pre-chamber 27 is also provided with a cooling fan grill 29, and reception module 25 has a hot air diffuser 30 in the upper part thereof to evacuate the air current from a cooling fan 31 arranged below said venting grille 29 and that allows the cooling down of baking mold 28 and the final product contained therein after baking. Likewise, reception module 25 has at least one source of light for the visualization of its interior, and of two hinges 32 that pass through said slots 23 of the closing seat 22 of the frame window 9, allowing the partial assembly of the front cover 7 on the chassis structure 26. On the other hand, inside reception module 25 baking molds will be arranged first for their accommodation or reception and then finally for their cooling down through the cooling fan 31 so that the user do not interact with them at very high baking temperatures.

Figure 6:
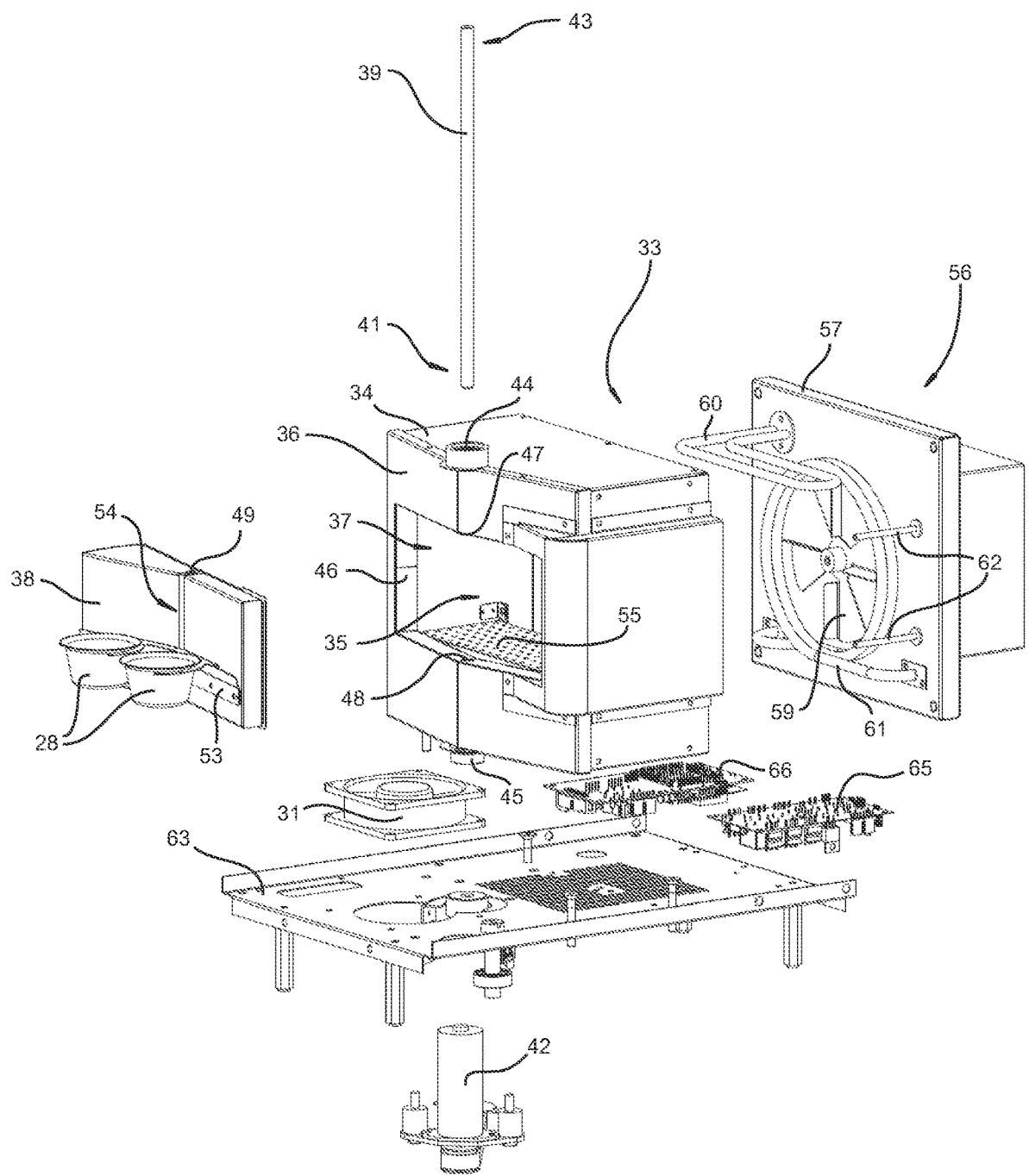
FIG. 6 shows an exploded perspective view of an oven module and heating module according to the present invention.

Together with reception module 25, FIGS. 4 to 6, shows at least one oven module 33 that comprises a main body 34 with an interior baking chamber 35, a front part 36 with a front opening 37 that forms a step between said reception module 25 and said interior baking chamber 35 and that it is operationally closable by a rotary oven door 38. For this purpose, rotary oven door 38 is rotatable mounted on and driven by a rotary drive mechanism that comprises a rotation axis 39 passing through said rotary oven door 38 to jointly define a rotary partition wall 40, wherein said rotation axis 39 has a lower end 41 mounted on an actuating driving mechanism, such as a motor 42, a stepper motor or a moto-reducer and a top end 43 mounted on a first bearing 44 that is arranged in a top part of main body 34 of oven module 33. A second bearing 45 is arranged in the lower part of said main body 34 so that said rotation axis 39 passes through the main body. If a stepper motor is employed, the motor will move door 38 and will block the door in the corresponding position.

It is remarked that front opening 37 comprises an internal face 46 that has top and lower holes 47, 48 in an intermediate portion of its horizontal sides, while rotary oven door 38 has a central orifice 49 that extends vertically in the form of a guide passage 52 which coincides with said top and lower orifices 47, 48, so that said rotation axis 39 passes through top and lower orifices 47, 48 and central orifice 49. Rotary oven door 38 is provided together with internal door sensors (not shown) that can be end stop sensors and is mounted on said rotation axis 39 by means of respective locking clamps 51 provided in internal portions of said guide passage 52.

Rotary oven door 38 is provided with a mold housing or mold support 53 that receives at least one baking mold 28. Mold housing or mold support 53 is arranged on one face of rotary oven door 38 at a height such that baking housed molds 28 are suspended above a grill 55 provided in said interior baking chamber 35 of oven module 33 and above said venting grille 29 provided in said reception module 25, so that the baking mold 28 can be homogeneously enveloped by a stream of heating and cooling air respectively. It is remarked that the height of mold housing or supports 53 can vary for adjusting to the needs of each user without any inconvenience, so that it can be positioned higher or lower as appropriate. A universal position, however, is preferably designed to all available molds and recipes.

The rotary drive mechanism by motor or moto-reducer 42 causes rotation axis 39 to rotate so that baking molds 28, placed in mold housing 53 of the rotary oven door 38, may be positioned in locations such as inside reception module 25 and inside oven module 33, according to the respective stages of the baking process. Rotation axis 39 is mounted between said first bearing 44, locking clamps 51 of guide passage 52, second bearing 45 and motor 42 which is actuated by an electronic controller system.

Thus, oven module 33 is heated by a heating module that comprises a back frame 57 equipped with a convection fan motor 58 that drives a convection fan paddles 59, a lower resistance 61, optionally an upper resistance 60 and a pair of sensors 62, such as NTC sensors, electronic thermal sensors. The joint arrangement of the upper and lower resistance 60, 61 with the rotation of the convection fan paddles 59, as well as the suspended or hanging manner baking molds 28 are arranged, will allow a homogeneous heating of the interior baking chamber 37 and consequently of 28 molds, containing the dough product to be baked, in order to achieve a better quality product in less time.

On the other hand, said reception module 25 and oven module 33 are arranged on a main board 63 together with motor 42, such as a stepper motor, cooling fan 31, and at least one switching power supply 64, all of them operatively connected to a power board 65 that feeds energy to a control board 66 operatively connected with said motor, among others. Power board 65 and control board 66 define or form a low level control board and both boards 65, 66 are optionally merged into only one board forming the low level control board. Said upper cover 2, bottom cover 3, rear cover 5 and front cover 7 are also removably mounted on said main board 63 through respective fixing screws.

The invention further comprises a high level control board 50 with WiFi, Bluetooth connections and an audible alarm. High level control board 50 is operatively connected to said low level control board, for sending and receiving all the information corresponding to the operation of the machine, that is, all the physical processes. High level control board 50 includes the buttons, display screen and communication modules. Low level control board contains the energy source and provides the actuation to the mechanical components of the machine. In turn, the apparatus of invention can be connected to 110 v or 220 v power supply. The WiFi or Bluetooth connection allows the apparatus to be commanded from mobile devices and other computer devices and software that can collect and report the generated data. This allows the apparatus to be updated of new recipes and also delete or amend obsolete recipes.

The apparatus of the invention is able to understand the information set in the recipes for the cooking process. It also has a special memory space for each event registration, i.e. each of all of the cooking process ever done, with date and time recognition in order to record each point surveyed chronologically, as well as the time zone of the place depending on the location. It reports each cooking process and, in case that it exists, each failure with cause or code to identify what went wrong.

Figure 7:
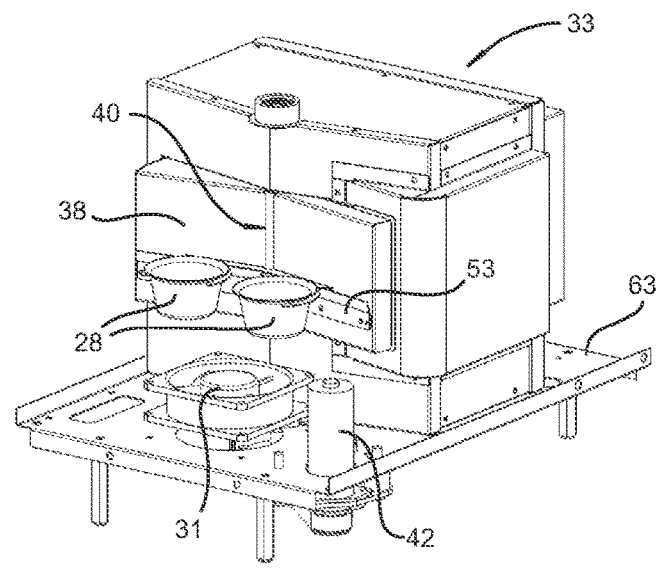
FIGS. 7 to 9 show the rotation sequence of a rotary oven door provided in the oven module according to the present invention.
Figures 8, 9:
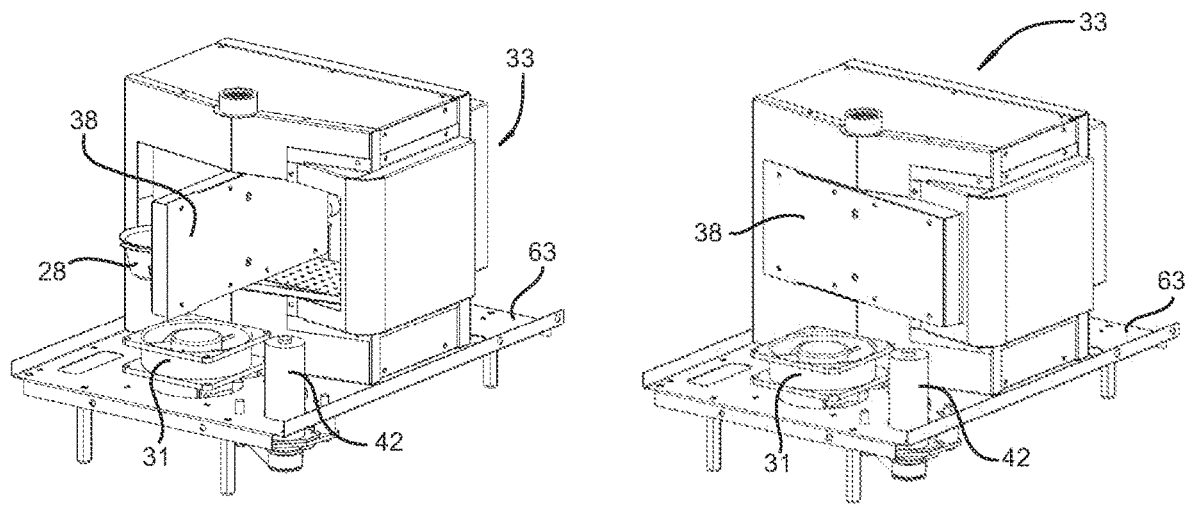

According to the steps or stages of the baking and cooling down process, rotary oven door 38 operatively rotates through its rotary partition wall 40 defined in conjunction with rotation axis 39, in order to position face 54, provided with mold housing 53 supporting baking mold 28, between a receiving position, i.e. inside pre-chamber 27, a baking position, i.e. inside interior baking chamber 35, and/or a cooling down position, i.e. again inside pre-chamber 27, as shown in the sequences illustrated in FIGS. 7 to 9. Thus, the use of a rotary oven door 19 together with its rotary drive mechanism will allow a safer baking process, avoiding the excessive use of mechanical parts that can generate a high cost and their time, a greater probability of failure of the parts that affects the operation of the equipment. By means of the invention, the drawbacks of the prior art are solved, in addition, the apparatus of the invention provides a better baking process with a current of heating air surrounding the baking molds suspended inside interior baking chamber 35 of the oven module 33, and subsequently a better cooling down inside pre-chamber 25 to prevent the user from being harmed or burned.

With regard to a preferred operation or mode of use of the apparatus of the invention, the following steps can be done:

1. The device may be connected preferably to a 220 v or alternatively to 110 v outlet with ground, TBD for every production batch.
2. The circuit breaker switch located at the back of the apparatus will be activated.
3. The device will now be set to idle state, while turning on the On/Off button light 14 on the front of the apparatus and enabling the remote connection.
4. Once turned on, manually or by the mobile app, the apparatus will beep and start the preheating process until it reaches the preset temperature, which temperature will depend of several variables, but as an example it may be said that is currently 140° C. in 3 minutes, in the shortest possible time.
5. Meanwhile, the apparatus is now able to receive cooking orders from the physical interface of the control panel 11 or from the mobile app.
6. The apparatus will remain in a range of ±10° C. of the preheat temperature set until the arrival of a new order.
7. After 15 minutes of command inactivity, the apparatus automatically shut down and return to its idle state.
8. At all times that the user opens the door 19, a light will illuminate the pre-chamber 27 area in order to have a good visualization of the contained elements.
9. Once selected the recipe to cook, the apparatus will start the heating process until it reaches the initial temperature of the selected cooking process, in the shortest time lapse and stabilizing it at ±10° C., regardless of the previous temperature.
10. Once the initial temperature of the selected recipe has been reached, the apparatus must check with a sensor 21 that the door 19 is properly closed.
11. The door 19 will now be locked, according to safety actions dictated by the apparatus of the invention. This will happen whenever the oven module is in operation.
12. Once confirmed the proper closing of the door 19, the baking molds 28 will be entered to the oven through the internal door rotation system. Before such step, the user must open a capsule containing the dough product to be cooked or baked and the dough must be poured into corresponding baking mold 28. The user can place baking mold 28 in mold housing 53 by, for example, a handling tool. It is also envisaged that the capsule, depending on its material, is directly placed in the mold housing once opened.
13. As soon as the insertion of baking molds 28 into baking chamber 35 of the module oven has been confirmed by the end stop sensor that determines the proper closure of the rotary oven door 38 in front opening 37, the cooking or baking process will begin. The proper closing is achieved by the peripheral sides of rotary oven door 38 which seal against inner face 46 of front opening 37.
14. The temperature will be constantly checked to keep stable the parameters dictated by the chosen recipe with a tolerance of ±10° C.
15. The control instances of each recipe must be complied within time and temperature.
16. Once the cooking or baking process has finished, the baking molds 28, or the capsules, will be removed from the interior baking chamber of the oven module, by the rotation of rotary oven door 38.
17. As soon as the correct opening of the rotary oven door 38 is confirmed and after the preset time of cooling in the pre-chamber 27 area has elapsed, the sound alert will beep and door 19 will be unlocked in order to allow the user to open the door and extract molds 28 with the baked product.
18. The apparatus of the invention will now return to the preheat temperature.
19. The apparatus will now enter the state of steps 5, 6 and 7.

The invention is also able to be updated remotely, as it has a remote management and communication system, capable of communicating with all machines, in order to load new firmware versions thank to having WiFi and blue-tooth connection capacities. In addition, new cooking recipes are able to be loaded and/or removed remotely easily, by the administrator.

As to the event report, it is possible to check every event in the history of each device, as well as their eventual failures or error codes. Ignition and use periods can be seen and erased individually or grouped from this list. It is possible to select the language to be used in each user interface. Within the editing parameters of the external control system is the preheating temperature, the cooling time in the pre-chamber area before opening the door 19 and the temperatures and times of the recipes. For each cooking process, called recipes, time and temperature parameters are determined. Each recipe has "n" periods set in number of seconds and temperature in Celsius degrees.

The oven module is able to reach the target temperatures in the shortest time possible, regardless of the initial and final temperature set, considering the optimized use of the heating elements, the ventilation elements and convection and the thermal inertia of the oven itself. This process of temperature change is optimized both to reach higher and lower temperatures than the actual oven temperature. Each time any target temperature is reached, it remains stable with a tolerance of ±10° C. during the set period of time until the next requested control point.

For the baking molds access to the oven, it is used the same door 19 as for the entry and for the removal, with an automatic mechanism defined by the rotary oven door. This rotary oven door always, in exception of the moving process, keeps the interior baking chamber closed in order to keep the internal temperature of the oven and optimize the operating times. This achieved by the peripheral faces or sides of rotary oven door 19 that seals against inner face 46 of front opening 37.

As a part of the apparatus safety system, the pre-chamber is provided between the outside of the device and the access to the oven module. This guarantees that the user does not have direct access or contact with highest temperature areas, as well as to moving pieces that could cause blockages. Also, this area helps the cooling process of the cooked or baked product once its cooking process has finished and serves as a receiver for the cooking molds.

In order to avoid sliding of the device on the working surface, scratches of the equipment or its surroundings and breakage of the casing, the invention must have non-slip glides on the lower case. The external temperature of the equipment does not exceed the temperatures stablished by the safety requirements valid worldwide, the appropriate materials, mechanisms and insulators are used to prevent high temperature transmission and leakage.

Window 9 allows the comfortable removal of the molds or capsules using a handling tool, as well as the correct visualization of the internal elements with which the user takes contact. The invention has an electrical connection at 220 v or 110 v, to be determined for every production batch. The power source is calculated based on the demand of the equipment at its most demanding point. It has a ground connector and the type of the tab depending on the country of destination of the lot. It also has the circuit breaker switch located at the back of the device in order to suspend the power input without the need to disconnect the cable from the power source.

The invention has a sound alarm on its high level control board that indicates both power on and off and changes between different status or faults and errors. The intensity and intermittency should then vary according to each type of indication. It must have a light that indicates the state of On/Off or idle constantly, which changes both color and intensity depending on the state or process in progress. This indicator is enabled once the circuit breaker switch located at the rear of the apparatus is enabled. The apparatus of the invention stops its operation in case that anomalies are detected that could end in mechanical interruptions or exposures to high temperatures not contemplated or programmed in the sequence of operational use.

A thermal fuse is considered to stop the electrical operation of the machine if the usual working temperatures are exceeded. The door opening sensor is used that will stop the operation of the rotary oven door in case that the user opens the door 19 at any other time than the default to do so. The rotary oven door sensor is also included in order to verify if the opening or closing process of the door is interrupted by any reason. Any interruption in operation due to a possible error of use or equipment failure is be accompanied by an audible alarm that indicates it, located on the high level control board.

Any part of the invention that takes contact to the exterior or may have some type of contact with the user is lack of sharp edges or angles that could cause injuries.

On the other hand, if the dough product comes in heat-sealed plastic capsules with peelable lids, the dough is unmolded in a baking mold, suitable for food, non-stick, that supports cooking temperatures and cooking times, reusable and washable. This mold will be housed in the mold housing that will enter to the oven module in a simple way and without the possibility of falls, bad postures or any type of error that can produce a malfunction during the process. Once the cooking process is finished, it will wait to be removed in the pre-chamber 27 area. When removed, the user will unmold the product for consumption and can reuse the mold 28 once clean. As indicated above, it is clear that the product containing capsules can be inserted into the oven if the capsules material is resistant to the baking temperatures.

Because of the high cooking temperatures, the handling of these cooking molds may be carried out with a handling tool that acts as a link with the user, both to avoid contact with the mold, as well as with its housing inside of the machine. This tool allows the placement and removal of the mold in its housing inside the machine, as well as the possibility of retaining it to be able to unmold the cooked product in an inverted position, so it should not interfere with the dough exit.

We claim:

1. An automatic apparatus for baking pastry products, wherein the automatic apparatus (1) is capable of receiving at least one baking mold (28) containing a pastry dough to be baked, the apparatus comprising:
   an oven module (33) comprising a main body (34) defining an interior baking chamber (35) that is heated by a heating module (56), and
   a reception module (25) adjacent to the oven module (33) wherein
   the oven module (33) comprises a front part (36) with a front opening (37) forming a passage between the reception module (25) and said interior baking chamber (35), with the passage being operatively closable by a rotary oven door (38) that forms a rotary partition wall (40) rotatable between a first position wherein one face (54) of the rotary oven door (38) is within said interior baking chamber (35), and a second position wherein said one face of the rotary oven door (38) is within said reception module (25); and wherein
   the rotary oven door (38) is provided with at least one mold housing (53) suitable for receiving at least one baking mold (28), and arranged in said one face (54) of said rotary oven door (38) at a height such that the at least one baking mold (28) is suspended within said interior baking chamber (35) of the oven module (33) once the rotary partition wall (40) in in said first position and above a venting grille (29) provided in said reception module (25) once the rotary partition wall (40) in in said second position, so that the at least one baking mold (28) is wrapped homogeneously by at least one stream of heating air inside the interior baking chamber (35) and by at least one stream of cooling air inside the reception module (25).

2. The automatic apparatus for baking pastry products according to claim 1, wherein the rotary oven door (38) is rotatably mounted and driven by a rotary drive mechanism that comprises a rotation axis (39) that passes through said rotary oven door (38) to define together said rotary partition wall (40), wherein said rotation axis (38) has a lower end (41) that is mounted on a motor (42) and a top end (43) mounted on a first bearing (44).

3. The automatic apparatus for baking pastry products according to claim 2, wherein said front opening (37) comprises an internal face (46) that includes top and lower orifices (47-48) in an intermediate portion of horizontal sides of the internal face, with said rotary oven door (38) having a central orifice (49) that extends vertically in a form of a guide passage (52) which coincides with said top and lower orifices (47-48), so that said rotation axis (39) passes through said top and lower orifices (47-48) and said central orifice (49).

4. The automatic apparatus for baking pastry products according to claim 3, wherein said rotary drive mechanism further comprises a second bearing (45) mounted on a lower portion of the main body (34) of the oven module (33) and in which said rotation axis (39) is mounted, said rotary oven door (38) being provided with internal door sensors and being mounted on said rotation axis (39) by means of respective locking clamps (51) provided in internal portions of said guide passage (52).

5. The automatic apparatus for baking pastry products according to claim 1, wherein said interior baking chamber (35) has a grid (55) and said mold housing (53) is arranged in said rotary oven door (38) at a height such that the at least one baking molds (28) is suspended above said grid (55).

6. The automatic apparatus for baking pastry products according to claim 1, wherein the rotary oven door (38) has a face (54) including said mold housing (53) and the rotary oven door rotates operatively by its rotary partition wall (40) so as to place said face (54), provided with the mold housing (53), between receiving, baking and cooling positions.

7. The automatic apparatus for baking pastry products according to claim 5, wherein the reception module (25) comprises a chassis structure (26) within which a reception/cooling pre-chamber (27) is defined, for receiving said at least one baking mold (28), the reception/cooling pre-chamber (27) being provided with said vent grill (29), with a hot air diffuser (30) in an upper part of the chassis structure, with at least one light source, and with a cooling fan (31) arranged below said venting grille (29).

8. The automatic apparatus for baking pastry products according to claim 1, wherein said reception module (25) and oven module (33) are arranged on a main board (63), and the main board includes at least one switching power supply (64) operatively connected to a power board (65) that feeds a control board (66).

9. The automatic apparatus for baking pastry products according to claim 1, wherein the heating module (56) comprises a back frame (57) provided with a convection fan motor (58) that drives a convection fan paddle (59), a lower resistance (61) and a pair of electronic thermal sensors (62).

10. The automatic apparatus for baking pastry products according to claim 1, further comprising an upper cover (2), a bottom cover (3) provided with a venting grille (4), a rear cover (5) provided with a circuit breaker switch and a front cover (7) that comprises a front (8) with a frame window (9) in whose upper part there is a housing (10) for a control panel (11), and which is closed by means of a door (19) with handle (20), said frame window (9) being in turn provided with at least one open door sensor (21) and respective through slots (23), with hinges (32), arranged in a portion of said reception module (25), passing through said through slots.

11. The automatic apparatus for baking pastry products according to claim 10, wherein the control panel (11) comprises a physical interface with a display screen (12), at least an on/off touch button (13), a confirm/cancel button, a selector and a display front (18).

12. The automatic apparatus for baking pastry products according to claim 11, further comprising a high level control board with WiFi and Bluetooth connections and with an audible alarm, and a low level control board operatively connected to said high level control board.

* * * * *